United States Patent Office 3,201,481
Patented Aug. 17, 1965

3,201,481
METHOD OF PREPARING 4-NITROSTILBENES
Sigmund C. Catino, Rensselaer, and Albert F. Strobel, Delmar, N.Y., assignors to General Aniline & Film Corporation, New York, N.Y., a corporation of Delaware
No Drawing. Filed Apr. 15, 1964, Ser. No. 360,080
18 Claims. (Cl. 260—645)

The present invention relates to, in general, an improved method for preparing 4-nitrostilbenes and, in particular, to an improved method for the preparation of 4-nitrostilbenes by the condensation of a 4-nitrotoluene with an aromatic aldehyde in the presence of a catalyst comprising an alkali or alkaline earth metal salt of an arylsulfonamide and an alkali metal carbonate.

Heretofore, 4-nitrostilbenes have been prepared by condensing aromatic aldehydes with a variety of nitrobenzenes in the presence of strong basic catalyst such as sodium hydroxide or sodium methoxide, but the yield and purity of product produced is such that any commercialization of the method would be economically unattractive. Efforts to improve the yield and purity of products of the reaction by the use of milder basic catalysts such as piperidine or secondary amines were unavailing unless there was an electronegative substituent ortho to the methyl group of the 4-nitrotoluene reactant.

Accordingly, it is an object of this invention to provide an improved method for the catalytic condensation of 4-nitrotoluenes and aromatic aldehydes which is universally applicable and is not dependent upon the nature of 4-nitrotoluene reactant.

Another object of this invention resides in the provision of an improved process for the condensation of a 4-nitrotoluene and an aromatic aldehyde which is economically attractive and results in products in high yield and of a sufficiently high degree of purity as to render them suitable for use in the manufacture of fluorescent brightening agents.

Yet another object of the invention resides in the provision of an improved method for the catalytic reaction of a 4-nitrotoluene and an aromatic aldehyde wherein the catalyst employed does not substantially effect the purity of the reaction products.

Still other objects, features and advantages of the invention will become further apparent from the following detailed description thereof.

In accordance with the aforesaid objects of the invention, a method has been devised which comprises condensing a 4-nitrotoluene and an aromatic aldehyde in the presence of a catalyst composition comprising an alkali or alkaline earth metal salt of an arylsulfonamide and an alkali carbonate.

A unique feature of the invention is that nitrostilbenes of pure quality are obtained in better yield when using the catalyst combination than if the alkali carbonate is omitted. Also, the amount of alkali or alkaline earth metal salt of an arylsulfonamide may be decreased by employing an alkali carbonate in combination therewith thus resulting in an economic advantage. The employment of the catalyst combination also permits the use of lower temperatures in contrast to other known methods for preparing 4-nitrostilbenes.

The reaction whereby the 4-nitrostilbenes are prepared can be illustrated, conveniently, by reference to the follownig equation wherein benzaldehyde and 4-nitrotoluene are illustrative of the reactants and the sodium salt of N-methyl benzene sulfonamide and potassium carbonate are illustrative of the catalyst system:

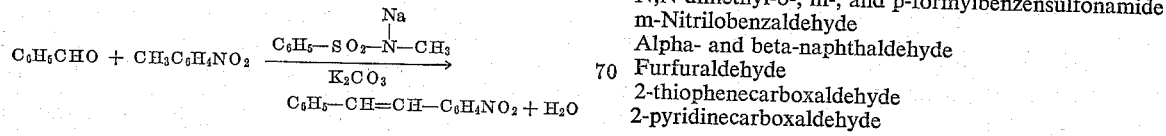

The sulfonamides which are used in practicing the present invention are the alkali and alkaline earth metal salts of arylsulfonamides wherein the aryl group is illustrated by phenyl and naphthyl which may further contain substituents such as lower alkyl, e.g., methyl, ethyl, dimethyl, halogen such as chloro and bromo, nitro and the like; the amide group may be the free amide group or a mono substituted amide group wherein the substituent may be lower alkyl, such as methyl, ethyl and butyl, cycloaliphatic such as cyclohexyl, aralkyl such as benzyl, aryl such as phenyl and naphthyl and wherein the N-substituent may contain additional inert substituents such as lower alkyl, halogen, nitro and the like; and wherein the alkali and alkaline earth metal salts comprise sodium, potassium, calcium, magnesium.

Typical arylsulfonamides whose alkali and alkaline earth metal salts are used as co-catalysts in practicing the present invention comprise:

Benzenesulfonamide
N-methyl and N-ethylbenzenesulfonamide
N-chloroethylbenzenesulfonamide
Benzenesulfonanilide
Benzenesulfon-o-, m- and p-toluidide
Benzenesulfonxylidide
Benzenesulfon-m-chloroanilide
N-methyl-o- and p-toluenesulfonamide
N-methyl-m-chlorobenzenesulfonamide
N-methyl-1-naphthosulfonamide Particularly preferred arylsulfonamides are the N-unsubstituted and N-monoalkyl substituted arylsulfonamides in that the reaction proceeds more readily when they are employed in contrast to the use of the N-aryl substituted arylsulfonamides, although the latter are operative.

As alkali metal carbonates, both sodium and potassium carbonate operate effectively as catalyst components in the condensation reaction to produce 4-nitrostilbenes.

The nature and character of the aromatic aldehyde which can be employed in accordance with the invention is not necessarily critical. Any aromatic aldehyde, whether containing one or more substituents in the nucleus, is operative for the purposes of the invention it being understood, of course, that the stilbene produced will correspond in structure to the aromatic aldehyde which is employed. Aromatic aldehydes which can be employed in practicing the present invention can be represented by the general formula:

$$R-CHO$$

wherein R represents an aromatic moiety such as phenyl, naphthyl, furyl, thienyl, pyridyl, piperidyl and the like which can be further substituted with lower alkyl groups such as methyl, ethyl and the like; halogen groups such as chloro, fluoro and bromo; nitro, nitrilo, $SO_2Z$ groups where Z represents a lower alkyl group; an amino group or a mono- or di-substituted alkyl or arylamino group and the like.

Typical and representative aromatic aldehydes which can be employed in accordance with the invention include:

Benzaldehyde
o-, m-, and p-chlorobenzaldehyde
2,4-, 2,4- and 2,6-dichlorobenzaldehyde
o-, m-, and p-bromobenzaldehyde
o-, m-, and p-nitrobenzaldehyde
2,4-dinitrobenzaldehyde
N,N-dimethyl-o-, m-, and p-formylbenzensulfonamide
m-Nitrilobenzaldehyde
Alpha- and beta-naphthaldehyde
Furfuraldehyde
2-thiophenecarboxaldehyde
2-pyridinecarboxaldehyde Likewise, either 4-nitrotoluene per se or substituted 4-nitrotoluenes may be employed in practicing the present invention, it being understood that when a substituted 4-nitrotoluene is employed a correspondingly substituted 4-nitrostilbene will be produced as the product. The 4-nitrotoluenes which can be employed in practicing the present invention may be illustrated by the following general formula:

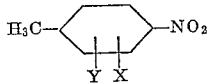

wherein X and Y each represent hydrogen or substituents such as chlorine, bromine, nitro, nitrilo, ethyl, methyl, carboxyl, and sulfonic acid groups and the like. Specific 4-nitrotoluenes are:

4-nitrotoluene
2-chloro-4-nitrotoluene
2-bromo-4-nitrotoluene
5-nitro-o-toluenesulfonic acid
N,N-dimethyl-5-nitro-o-toluenesulfonamide
5-nitro-o-toluic acid
6-nitro-m-toluic acid As illustrated by this list of 4-nitrotoluene compounds, it should be emphasized that the use of the alkali and alkaline earth metal salts of arylsulfonamides in conjunction with alkali carbonates as condensation catalyst in accordance with the present invention is generally applicable and beneficial in the reaction of benzaldehydes or naphthaldehydes with 4-nitrotoluenes which do not contain electronegative substituents.

As previously mentioned, the condensation of the benzaldehyde with the 4-nitrotoluene in the presence of the sulfonamide-carbonate catalyst of the present invention is carried out in an inert solvent in which the aldehyde, catalyst and 4-nitrotoluene have at least a limited degree of mutual solubility. The particular solvent which is employed will depend to a large extent on the substituents (and resulting solubility properties) of the particular aldehyde, nitrotoluene or sulfonamide-carbonate catalyst which is employed. Thus, if a solubilizing group such as a sulfonic acid substituent is present in both the aldehyde and 4-nitrotoluene so that both reactants are soluble in water, the reaction may advantageously be carried out in water since in this medium both reactants and catalyst are soluble. When a solubilizing group like the sulfonic acid group is present in the aldehyde, as for instance in 3-formylbenzene sulfonic acid, but the p-nitrotoluene employed contains no water solubilizing group as for example when p-nitrotoluene itself is used, then a sufficient amount of an inert mutual solvent, such as triethanol amine, polyoxyethylene (Carbowax), dimethylformamide, N,N-dimethylacetamide, and the like, should be employed in order to bring the reactants into sufficient common solution. When neither the aldehyde nor the 4-nitrotoluene derivative contains a water solubilizing group, it is necessary to introduce a certain amount of solvent so as to bring the salt of the arylsulfonamide into solution with the reagents since the salt of the arylsulfonamide is too insoluble in the mixture of aldehyde and 4-nitrotoluene to bring about such reaction.

The optium temperature and reaction time depend to a great extent on the nature of the substituent in the 2-position of the 4-nitrotoluene and only slightly on the aldehyde substituents. The temperature may range from about 40–140° C., although a temperature above 110° C. is rarely used since above 110° C. the reaction of 4-nitrotoluene with itself becomes relatively more important especially when using the more alkaline catalysts of this invention. When the 2-position contains a halogen atom such as chlorine a somewhat lower condensation temperature and shorter reaction time are required than when the 2-position is unsubstituted. When the 2-position contains a strongly electronegative substituent, such as nitrilo or sulfo groups, the reaction proceeds much easier at a lower temperature and shorter time. Reaction times generally range from about 2 to about 72 hours.

The amount of solvent used to produce mutual solubility of aldehyde, catalyst and 4-nitrotoluene can be varied from about one-third of the amount of either reagent to ten times as much as either reagent. The solvents may be polyethylene glycols, polypropylene glycols, Cellosolves (monoalkyl ethers of glycol), dioxane, alcohols, tertiary amines and alkylolamines, water, and in many cases diluents like benzene, ethylene dichloride and the like can be employed. It has been observed, however, that the hydroxylic solvents have a definite lowering influence on yield compared with other solvents.

Usually, the amounts of the reagents employed involves using equimolecular amounts of each, but as much as five-fold excess of either reagent may be used especially if it is an inexpensive, readily available material compared with the other reagent. The amount of arylsulfonamide may vary from about 2%–25% of the amount of the aldehyde and the amount of alkali carbonate can vary from 25%–2% of the aldehyde.

The details of the present invention will be apparent to those skilled in the art from a consideration of the following examples which illustrate and describe preferred embodiments of our inventinon:

EXAMPLE 1

*Preparation of 2-chloro-4-nitrostilbene*

A 500 cc. flask is charged with 85.8 g. of 2-chloro-4-nitrotoluene (0.5 mol), 58.7 cc. of benzaldehyde (0.58 mol), 86 cc. of Carbowax 400 (polyethyleneglycol of average molecular weight of 400), 10.4 g. of the sodium salt of N-methyl-p-toluenesulfonamide (0.05 mol) and 10.6 g. of sodium carbonate (0.1 mol). After heating at 50° C. for 6 hrs., 10.6 additional g. of sodium carbonate is added. After 16 hrs. at 50° C. an additional 10.6 g. of sodium carbonate is added. After heating for 50 hrs. at 50° C., the charge is drowned into 500 cc. of water at 50° C., cooled to 10° C. and the water decanted. The residue is slurried in 500 cc. of water at 50° C., cooled to 10° C. and the water decanted. The residue is slurried in 500 cc. of water at 95° C. and made phenolphthalein alkaline with caustic soda. It is stirred at 95° C. for 15 min., cooled to 5° C. and the water decanted. The residue is washed with cold water and then slurried in 500 cc. of methanol at the boil, cooled to 0° C. and filtered. The cake is washed with 100 cc. of methanol and dried. A 63% yeild is obtained, M.P. 108.2°–110.8° C., K max.=90 at 352 mu (in methanol).

EXAMPLE 2

*Preparation of 2-chloro-4-nitrostilbene employing as sole catalyst N-methyl-p-toluenesulfonamide*

A 500 cc. flask is charged with 41.9 g. of 2-chloro-4-nitrotoluene (0.244 mol), 29.4 cc. of benzaldehyde (0.29 mol), 38 cc. of Carbowax 400, and 5.2 g. of the sodium salt of N-methyl-p-toluenesulfonamide. After heating at 60° C. for 4 hours, 4.0 g. of the N-methyl-p-toluenesulfonamide is added and it is heated at 60° for 12 hrs. An additional 4.0 g. of catalyst is added and maintained at 60° for 4 hrs., and then an additional 4.0 g. is added and the heat maintained at 60° C. for 38 hrs. The charge is drowned in 500 cc. of water at 50° C., cooled and the water decanted. This wash is repeated at Clayton Yellow alkalinity with caustic solution, the water decanted, the residue slurried in 500 cc. of methyl alcohol at the boil and filtered. The methyl alcohol is evaporated to about 200 cc. volume, cooled, filtered and washed with 100 cc. of methyl alcohol and dried. In this case, using N-methyl-p-toluenesulfonamide sodium salt as catalyst, a 49.7% yield is obtained, in contrast to the 63% yield of Example 1 wherein sodium carbonate is additionally present as catalyst.

EXAMPLE 3

*Preparation of 2-chloro-4-nitrostilbene employing as sole catalyst potassium carbonate*

A 500 cc. flask is charged with 42.9 g. of 2-chloro-4-nitrotoluene (0.25 mol), 30.4 cc. of benzaldehyde, 38 cc. of Carbowax 400 and 6.9 g. of potassium carbonate. After 1½ hrs. at 50° C., 3.45 g. of potassium carbonate is added. After 10 min. at 50° C. 3.45 g. of potassium carbonate is added. After ½ hr. at 50° C. 6.9 g. of potassium carbonate is added. After 18 hrs. at 50° C. 6.9 g. of potassium carbonate is added, and it is maintained at 50° C. for 52 hrs. The charge is then worked up as in Example 1. The yield is 50.5% in contrast to the 63% yield of Example 1 wherein N-methyl-p-toluenesulfonamide is additionally used as catalyst.

EXAMPLE 4

*Preparation of 4-nitrostilbene*

A 500 cc. flask is charged with 68.5 g. of 4-nitrotoluene (0.5 mol), 63.6 cc. of benzaldehyde (0.6 mol), 75 cc. of Carbowax 400, 10 g. of sodium salt of N-methyl-p-toluenesulfonamide and 14 g. of potassium carbonate. It is stirred 2 hrs. at 50° C., and 58 hrs. at 60° C. It is then drowned into 1000 cc. of water at 50° C., decanted, reslurried in water at 50° C., decanted, slurried in methyl alcohol at 68° C., cooled to 0° C. and filtered. It is washed with 100 cc. of cold methyl alcohol and dried. Yield 73.6%, M.P. 158.6°–159.5° C., K max.=116.3 at 345 mu (in methanol).

EXAMPLE 5

*Preparation of 4-nitrostilbene in which sodium sulfate is substituted for potassium carbonate*

A 500 cc. flask is charged with 68.5 g. of 4-nitrotoluene, 60.5 cc. of benzaldehyde (0.6 mol), 75 cc. of Carbowax 400, 10 g. of sodium salt of N-methyl-p-toluenesulfonamide, 16.35 g. of sodium sulfate anhydrous. It is heated 60 hrs. at 60° C. The charge is drowned into 1000 cc. of water at 50° C., decanted, reslurried in 1000 cc. of water at 50° C., decanted, slurried in 500 cc. of methyl alcohol at 68° C., cooled to 0° C., filtered, washed with 100 cc. of cold methyl alcohol and dried. A 58% yield is obtained in contrast to the 73.6% yield obtained in Example 4 wherein potassium carbonate is used.

EXAMPLE 6

*Preparation of 2'-chloro-4-nitrostilbene*

A 2 l. flask is charged with 206 g. of 4-nitrotoluene (1.5 mols), 196 g. of 2-chlorobenzaldehyde (1.8 mols), 300 cc. of Carbowax 400, 30 g. of N-methyl-p-toluenesulfonamide sodium salt, 60 g. of potassium carbonate and 60 cc. of triethanolamine. It is heated 60 hrs. at 60° C. The charge is drowned into 2 l. of water at 60° C., decanted, reslurried in 2 l. of water at 60° C., decanted, slurried in 1 l. of methyl alcohol at 68° C., cooled to 10° C. and filtered. The cake is washed with cold methyl alcohol and dried. A yield of 86.4% is obtained, M.P. 125.6°–127° C., K max.=96 at 341 mu (in methanol).

EXAMPLE 7

*Preparation of 2,4'-dichloro-4-nitrostilbene*

A 1 l. flask is charged with 171.5 g. of 2-chloro-4-nitrotoluene (1.0 mol), 168.6 g. of 4-chlorobenzaldehyde (1.2 mols), 200 cc. of Carbowax 400, 20.7 g. of sodium salt of N-methyl-p-toluenesulfonamide, 32.9 g. of potassium carbonate. It is heated at 50° C. for 48 hrs. An additional 5.3 g. of potassium carbonate is added and heating at 50° C. continued for another hour. The charge is drowned into 1 l. of water at 50° C., cooled to 10° C., decanted, reslurried in 1 l. of water made phenolphthalein alkaline with caustic at 95° C., cooled to 5° C., decanted, reslurried in 1 l. of methyl alcohol at the boil, cooled to 0° C. and filtered. It is washed with 200 cc. of methanol and dried. An 85.7% yield is obtained, M.P. 156.0°–157.2° C., K max.=89.7 at 350 mu (in methanol).

EXAMPLE 8

*Preparation of 4'-chloro-4-nitrostilbene*

A 500 cc. flask is charged with 68.5 g. of 4-nitrotoluene (0.5 mol), 84.2 g. of 4-chlorobenzaldehyde (0.6 mol), 75 cc. of Carbowax 400, 10 g. of N-methyl-p-toluenesulfonamide sodium salt, 14 g. of potassium carbonate. It is heated 60 hrs. at 60° C. The charge is drowned into 1000 cc. of water at 50° C., decanted, reslurried in 1000 cc. of water at 50° C., decanted, reslurried in 500 c. of methanol at 68° C., cooled to 0° C., and filtered. The filter cake is washed with 100 cc. of cold methanol and dried. A 65.6 yield is obtained, M.P. 189.2–190.4° C., K max.=111.1 at 349 mu (in methanol).

EXAMPLE 9

*Preparation of 2,4'-dichloro-4-nitrostilbene*

A 500 l. flask is charged with 85.8 g. of 2-chloro-4-nitrotoluene (0.5 mol), 84.2 g. of 4-chlorobenzaldehyde (0.6 mol), 75 cc. of Carbowax 400, 10.5 g. of N-ethyl-p-toluenesulfonamide sodium salt, and 14 g. of potassium carbonate. It is heated 60 hrs. at 60° C., and then worked up as in Example 8. A 67.4% yield is obtained, M.P. 142.6°–143.8° C., K max.=75.3 at 343 mu (in methanol).

EXAMPLE 10

*Preparation of 2-fluoro-4-nitrostilbene*

A 500 l. flask is charged with 77.5 g. of 2-fluoro-4-nitrotoluene (0.5 mol), 63.6 g. of benzaldehyde (0.6 mol), 75 cc. of Carbowax 400, 13 g. of benzenesulfonanilide potassium salt and 14 g. of potassium carbonate. It is heated 60 hrs. at 60° C., and then worked up as in Example 8.

EXAMPLE 11

*Preparation of 4'-chloro-2-fluoro-4-nitrostilbene*

A 500 l. flask is charged with 77.5 g. of 2-fluoro-4-nitrotoluene (0.5 mol), 84.2 g. of 4-chlorobenzaldehyde (0.6 mol), 75 cc. of Carbowax 400, 12 g. of N-chloroethylbenzenesulfonamide sodium salt, and 14 g. of potassium carbonate. It is heated 60 hrs. at 60° C., and then worked up as in Example 8.

EXAMPLE 12

*Preparation of 2,2'-chloro-5'-methyl-4-nitrostilbene*

A 500 l. flask is charged with 85.8 g. of 2-chloro-4-nitrotoluene, 92.7 g. of 2-chloro-5-methylbenzaldehyde, 75 cc. of Carbowax 400, 10 g. of N-methyl-p-toluenesulfonamide sodium salt and 14 g. of sodium carbonate. The charge is heated at 60° C. for 60 hrs., and then worked up as in Example 8.

EXAMPLE 13

*Preparation of 2-bromo-4'-chloro-4-nitrostilbene*

A 500 l. flask is charged with 108 g. of 2-bromo-4-nitrotoluene, 84.2 g. of 4-chlorobenzaldehyde, 75 cc. of Carbowax 400, 10 g. of N-methyl-p-toluenesulfonamide potassium salt, and 14 g. of potassium carbonate. The charge is heated for 60 hrs. at 60° C., and then worked up as in Example 8.

EXAMPLE 14

*Preparation of 4,4'-dinitrostilbene*

A 500 cc. flask is charged with 68.5 g. of 4-nitrotoluene, 90.6 g. of 4-nitrobenzaldehyde, 75 cc. of Carbowax 400, 10 g. of N-methyl-p-toluenesulfonamide sodium salt, and 14 g. of potassium carbonate. The charge is heated at 60° C. for 60 hrs., and then worked up as in Example 8.

What is claimed is:

1. In the method for the preparation of 4-nitrostilbenes by the condensation of a 4-nitrotoluene with an aromatic aldehyde in the presence of an alkaline catalyst, the improvement which comprises employing as said alkaline catalyst a composition containing a compound selected from the group consisting of alkali and alkaline earth metal salts of arylsulfonamides and an alkali carbonate.

2. The method according to claim 1 wherein the salt of the arylsulfonamide is the sodium salt of N-methyl-p-toluenesulfonamide and the alkali carbonate is sodium carbonate.

3. The method according to claim 1 wherein the salt of the arylsulfonamide is the sodium salt of N-methyl-p-toluenesulfonamide and the alkali carbonate is potassium carbonate.

4. The method according to claim 1 wherein the salt of the arylsulfonamide is the sodium salt of N-ethyl-p-toluenesulfonamide and the alkali carbonate is sodium carbonate.

5. The method according to claim 1 wherein the salt of the arylsulfonamide is the sodium salt of N-ethyl-p-toluenesulfonamide and the alkali carbonate is potassium carbonate.

6. The method according to claim 1 wherein the salt of the arylsulfonamide is the potassium salt of benzenesulfonamide and the alkali carbonate is potassium carbonate.

7. The method according to claim 1 wherein the salt of the arylsulfonamide is the sodium salt of N-chloroethylbenzenesulfonamide and the alkali carbonate is potassium carbonate.

8. In the method for the preparation of 2-chloro-4-nitrostilbene by the condensation of 2-chloro-4-nitrotoluene with benzaldehyde in the presence of an alkaline catalyst, the improvement which comprises employing as said alkaline catalyst a composition comprising the sodium salt of N-methyl-p-toluenesulfonamide and sodium carbonate.

9. In the method for the preparation of 4-nitrostilbene by the condensation of 4-nitrotoluene with benzaldehyde in the presence of an alkaline catalyst, the improvement which comprises employing as said alkaline catalyst a composition comprising the sodium salt of N-methyl-p-toluenesulfonamide and potassium carbonate.

10. In the method for the preparation of 2'-chloro-4-nitrostilbene by the condensation of 4-nitrotoluene with 2-chlorobenzaldehyde in the presence of an alkaline catalyst, the improvement which comprises employing as said alkaline catalyst a composition comprising the sodium salt of N-methyl-p-toluenesulfonamide and potassium carbonate.

11. In the method for the preparation of 2,4'-dichloro-4-nitrostilbene by the condensation of 2-chloro-4-nitrotoluene with 4-chlorobenzaldehyde in the presence of an alkaline catalyst, the improvement which comprises employing as said alkaline catalyst a composition comprising the sodium salt of N-methyl-p-toluenesulfonamide and potassium carbonate.

12. In the method for the preparation of 4'-chloro-4-nitrostilbene by the condensation of 4-nitrotoluene with 4-chlorobenzaldehyde in the presence of an alkaline catalyst, the improvement which comprises employing as said alkaline catalyst a composition comprising the sodium salt of N-methyl-p-toluenesulfonamide and potassium carbonate.

13. In the method for the preparation of 2,4'-dichloro-4-nitrostilbene by the condensation of 2-chloro-4-nitrotoluene with 4-chlorobenzaldehyde in the presence of an alkaline catalyst, the improvement which comprises employing as said alkaline catalyst a composition comprising the sodium salt of N-ethyl-p-toluenesulfonamide and potassium carbonate.

14. In the method for the preparation of 2-fluoro-4-nitrostilbene by the condensation of 2-fluoro-4-nitrotoluene with benzaldehyde in the presence of an alkaline catalyst, the improvement which comprises employing as said alkaline catalyst a composition comprising the potassium salt of benzenesulfonamide and potassium carbonate.

15. In the method for the preparation of 4'-chloro-2-fluoro-4-nitrostilbene by the condensation of 2-fluoro-4-nitrotoluene with 4-chlorobenzaldehyde in the presence of an alkaline catalyst, the improvement which comprises employing as said alkaline catalyst a composition comprising the sodium salt of N-chloroethylbenzenesulfonamide and potassium carbonate.

16. In the method for the preparation of 2,2'-chloro-5'-methyl-4-nitrostilbene by the condensation of 2-chloro-4-nitrotoluene with 2-chloro-5-methylbenzaldehyde in the presence of an alkaline catalyst, the improvement which comprises employing as said alkaline catalyst a composition comprising the sodium salt of N-methyl-p-toluenesulfonamide and sodium carbonate.

17. In the method for the preparation of 2-bromo-4'-chloro-4-nitrostilbene by the condensation of 2-bromo-4-nitrotoluene with 4-chlorobenzaldehyde in the presence of an alkaline catalyst, the improvement which comprises employing as said alkaline catalyst a composition comprising the potassium salt of N-methyl-p-toluenesulfonamide and potassium carbonate.

18. In the method for the preparation of 4,4'-dinitrostilbene by the condensation of 4-nitrotoluene with 4-nitrobenzaldehyde in the presence of an alkaline catalyst, the improvement which comprises employing as said alkaline catalyst a composition comprising the sodium salt of N-methyl-p-toluenesulfonamide and potassium carbonate.

No references cited.

CARL D. QUARFORTH, *Primary Examiner.*